J. M. WILSON.
Plow.

No. 79,091. Patented June 23, 1868.

Witnesses. Inventor:

United States Patent Office.

J. M. WILSON, OF LEXINGTON, MISSISSIPPI.

Letters Patent No. 79,091, dated June 23, 1868.

IMPROVEMENT IN PLOWS.

*The Schedule referred to in these Letters Patent and making part of the same.*

TO ALL WHOM IT MAY CONCERN:

Be it known that I, J. M. WILSON, of Lexington, in the county of Holmes, and State of Mississippi, have invented a new and useful Improvement in Plows; and I do hereby declare that the following is a full, clear, and exact description thereof, which will enable others skilled in the art to make and use the same, reference being had to the accompanying drawings, forming part of this specification, in which—

Similar letters of reference indicate like parts.

This invention relates to a new plow to be used by cotton-planters, its object being to work the ground when the young cotton-plants are just out.

Cotton when young is a very delicate and tender plant, and is difficult to work the first time. My improved plow is intended to work close to the plants without injuring the same, leaving the cotton on a very narrow space at the surface, yet with sufficient base at the bottom of the furrow to prevent its being knocked up by the hoes, when they are used in working through the drill. The plow will also turn up the soil sufficiently to thoroughly cover up the middle of the row.

This plow will work in every kind of land more effectually than the ordinary turning-plow.

A represents the upright of a plowshare attached to an ordinary or suitable plough-beam, B.

Figure 1:
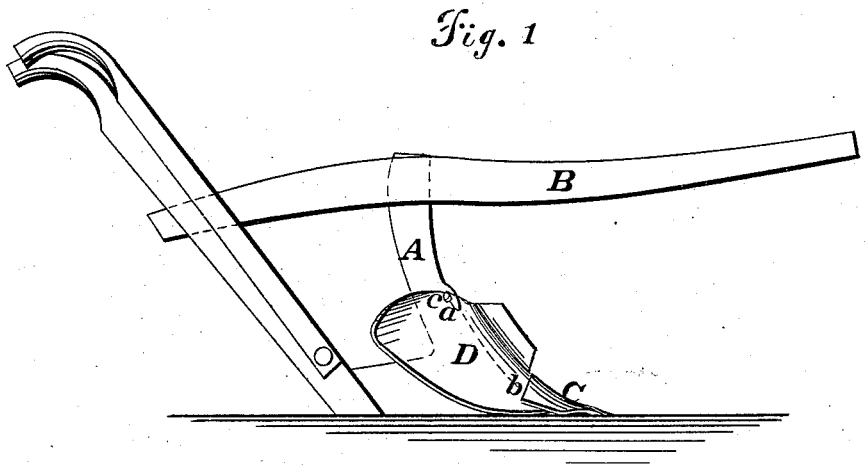
Figure 1 represents a side elevation of my improved plow.
Figure 2:
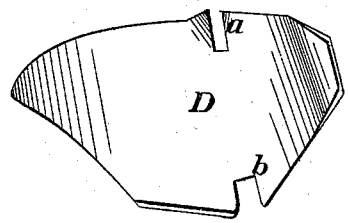
Figure 2 is a detail side view of the scraper-attachment of the same.

On the lower end of the upright, A, is formed a share, C, shaped similar to an arrow-head, as shown in fig. 1, its two working edges running to a point in front at rather an acute angle.

D represents a slab-iron scraper, fastened to the upright, A, and arrow C, as shown, it having two recesses $a\ b$, cut into it, which allow its inward bent upper and lower ends to be fastened to the upright, A, by means of a key, $c$, and by the wings of the arrow C, respectively.

The whole instrument now forms a share, with working edges on both sides of the arrow-point. One of these edges shaves near the cotton, the other cuts the furrow-slice and turns it into the middle of the row.

The arrow-share C is fastened either securely to the upright, A, by means of rivets, bolts, or otherwise, or is made of one piece with the same.

The scraper D can be easily removed from the plow, and some shovel or rooter, or other substitute, may be put in its place, if the plow is to be used for other purposes.

And if everything is taken off the arrow, the same will convert the plow into a No. 1 subsoiler.

Having thus described my invention, I claim as new, and desire to secure by Letters Patent—

1. A plow, consisting of the combination of the arrow C with the scraper D, all made and operating substantially as herein shown and described.

2. Providing the scraper D with notches $a\ b$, to facilitate its fastening to the standard A and arrow C, substantially as herein shown and described.

J. M. WILSON.

Witnesses:
  D. N. SAFFOLD,
  W. R. KENDALL.